Jan. 11, 1972   G. SCHORSCH   3,634,378
PROCESS FOR PRODUCING ACRYLONITRILE POLYMER USING A CATALYST
SYSTEM OF A CHLORATE, SULFUR DIOXIDE OR SULFUR DIOXIDE
LIBERATING COMPOUND AND A HYPOPHOSPHITE
Filed July 28, 1969   3 Sheets-Sheet 1
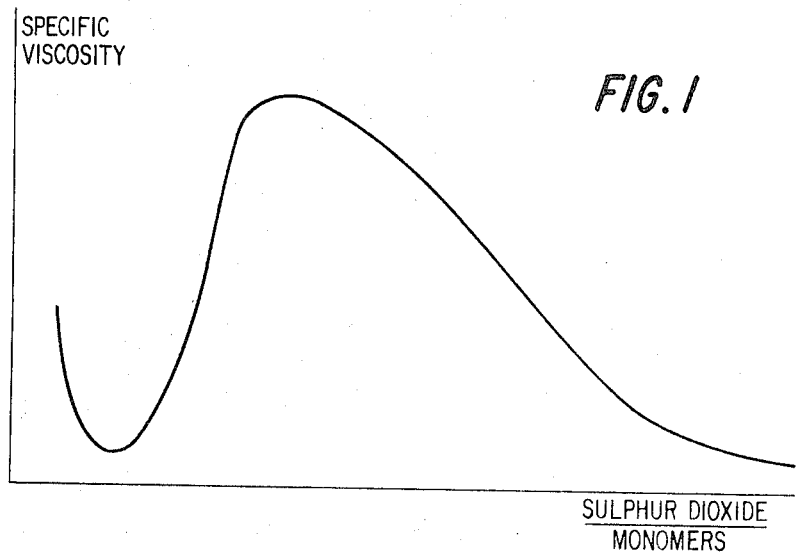
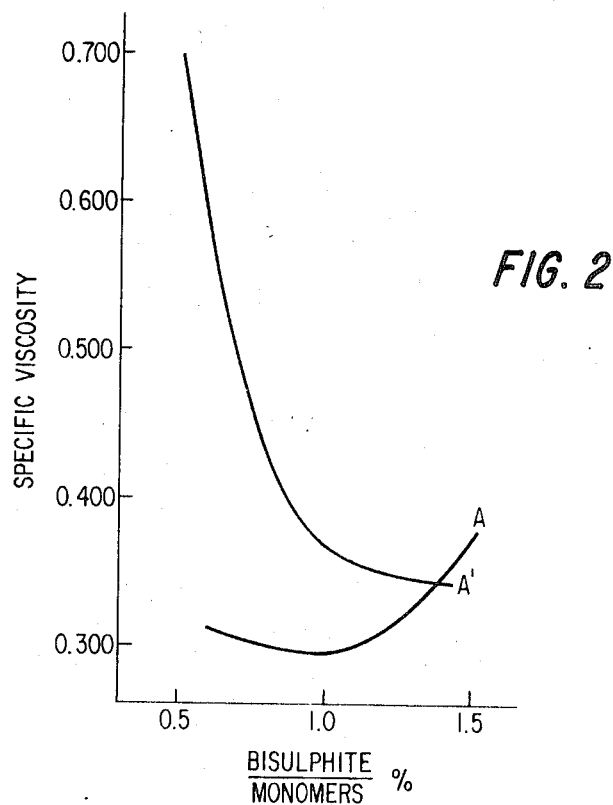
INVENTOR
GILBERT SCHORSCH
BY *Sherman & Shalloway*
ATTORNEYS

United States Patent Office 3,634,378
Patented Jan. 11, 1972

3,634,378
PROCESS FOR PRODUCING ACRYLONITRILE POLYMER USING A CATALYST SYSTEM OF A CHLORATE, SULFUR DIOXIDE OR SULFUR DIOXIDE LIBERATING COMPOUND AND A HYPOPHOSPHITE
Gilbert Schorsch, Colmar, France, assignor to CTA-Compagnie Industrielle de Textiles, Paris, France
Filed July 28, 1969, Ser. No. 845,424
Int. Cl. C08f 3/76, 15/22
U.S. Cl. 260—88.7                             10 Claims

ABSTRACT OF THE DISCLOSURE

A process for producing acrylonitrile polymers to produce a white polymer having excellent heat stability, excellent molecular weight stability, etc. comprising polymerizing acrylonitrile at a temperature of from 30–70° C. at a pH between 1.8 and 2.7 in the simultaneous presence of an alkali or alkaline earth chloride, sulfur dioxide or a compound capable of liberating sulfur dioxide in the polymerization medium, and an alkali or alkaline earth hypophosphite.

---

Figure 3:
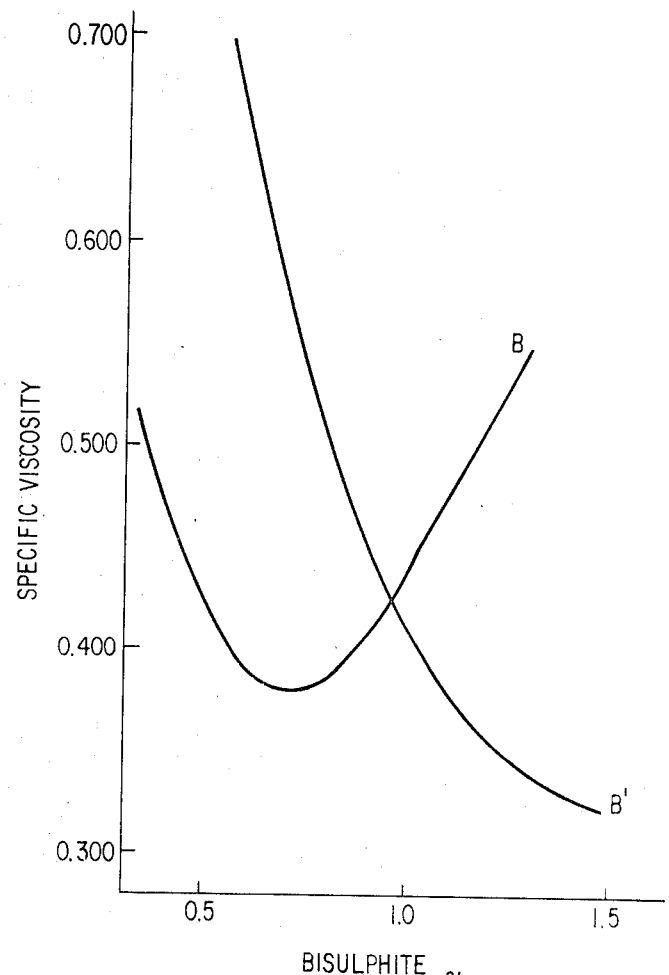

The present invention relates to a process for the polymerization of acrylonitrile or the polymerization of acrylonitrile and one or more additional ethylenically unsaturated monomers; more particularly, the present invention is directed to the production of polymers predominantly of acrylonitrile wherein such polmers are produced by a process allowing for the production of very white polymers, polymers having a stable molecular weight, and polymers which are substantially insensitive to the fluctuations of yield associated with conventional reagents for controlling specific viscosity.

The spinning of acrylonitrile polymers or polymers predominantly of acrylonitrile from solutions of the same in organic or mineral solvents is quite well known. In this connection, it is similarly well known that the spinning capability of such solution as well as the properties and characterstiics of the fibers obtained from the spinning process are better when the starting polymer or copolymer has a more regular molecular weight. Accordingly it always has been the desire of the art to provide a method of producing acrylonitrile-base polymers wherein a material of a regular and uniform molecular weight is produced.

In addition, it is pointed out that it is also known that fibers obtained from the spinning of acrylonitrile-base polymers from their solutions often have the tendency to be somewhat yellowish and to yellow as a reaction to the application of heat. Such a characteristic of the acrylonitrile fibers is a disadvantage and is troublesome especially in the course of subsequent treatments that the fibers must undergo either in the course of their production or in the course of producing textile fabrics and similar articles therefrom. Here again, therefore, it has been the constant desire to provide a process for the production of acrylonitrile-base polymers not possessing this tendency toward yellowing.

Polymerization of acrylonitrile in acidic medium in the presence of a chlorate and a sulfoxy reducing agent is known.

It is also known to produce a polyacrylonitrile having a uniform molecular weight by continuous polymerization in an aqueous medium in the presence of a persulfate or a chlorate and a sulfoxy reducing agent, working at an acidic pH maintained substantially constant.

While various attempts have been made to produce a white acrylonitrile polymer or copolymer or to produce a polymer having a uniform or regular molecular weight, until the development of the process of the present invention there was no satisfactory method for producing an acrylonitrile homopolymer or copolymer of uniform molecular weight and of a degree of whiteness such that the product was not subject to yellowing. This has now been accomplished, however, in acordance with the present invention whereby acrylonitrile either alone or with one or more ethylenically unsaturated monomers is polymerized to a white polymer showing excellent heat resistance and excellent uniformity in molecular weight, the polymerization being conducted in an aqueous medium in the presence of a particular combination of catalysts. Thus, it has been discovered in accordance with the present invention that a process eliminating the inherent deficiencies of the prior art can be provided by polymerizing or copolymerizing acrylonitrile in an aqueous medium at a pH of between 1.8 and 2.7 at a temperature between 30 and 70° C. in the copresence of an alkali or alkaline earth chlorate, sulfur dioxide or a compound capable of producing or liberating sulfur dioxide in the polymerization medium and an alkali or alkaline earth hypophosphite.

Accordingly, it is a principal object of the present invention to provide a process for the polymerization of acrylonitrile alone or with one or more ethylenically unsaturated monomers, which process eliminates the inherent deficiencies and disadvantages of previously employed prior art processes.

It is a further object of the present invention to provide a novel process for the polymerization of acrylonitrile either alone or with one or more ethylenically unsaturated monomers, such process allowing for the preparation of a white polymer showing excellent heat stability and excellent uniformity of molecular weight.

It is a still further object of the present invention to provide such a process for the preparation of homopolymers and copolymers of acrylonitrile wherein such process allows for the above advantages by polymerizing a monomeric system predominating in acrylonitrile in an aqueous medium at a pH ranging from 1.8 to 2.7 and at a temperature of from 30 to 70° C. in the copresence of a system comprising an alkali or alkaline earth chlorate, sulfur dioxide or a compound capable of liberating or producing sulfur dioxide in the polymerization medium and an alkali or alkaline earth hypophosphite.

Still further objects of the novel process of the present invention will become more apparent from the following more detailed description thereof.

The above objects and advantages of the novel process of the present invention are achieved by a process which comprises the homopolymerization of acrylonitrile or the copolymerization of a monomeric system comprising predominantly acrylonitrile but containing one or more additional ethylenically unsaturated monomers in an aqueous medium in the copresence of the aforedescribed catalyst system. Such a process capable of producing a white homopolymer or copolymer showing excellent heat stability and excellent stability and uniformity of molecular weight is conducted at a pH ranging between 1.8 and 2.7 at a temperature of from between 30° and 70° C. As indicated above, the polymerization reaction is conducted in the copresence of an alkali or alkaline earth chlorate, sulfur dioxide or a compound capable of producing sulfur dioxide in the polymerization medium, and an alkali or alkaline earth hypophosphite.

In accordance with the process of the present invention the amount of sulfur dioxide introduced into the reaction medium or formed in situ by the employment of a compound capable of producing or liberating sulfur dioxide should preferably be within the range of 0.25% to 1.5% by weight based upon the weight of the monomers present. In this regard, while larger quantities of sulfur dioxide may be employed and can be tolerated in the system substantially greater amounts of sulfur dioxide tend to cause a decrease in the level of polymerization of monomers to polymers. Accordingly, the employment of an amount of sulfur dioxide greatly in excess of the amount as set forth above tends to be disadvantageous and unsatisfactory from an economic standpoint since the polymerization process loses its profitable aspects. Accordingly, as mentioned above, it is preferred to operate in accordance with the present invention so that the sulfur dioxide introduced or formed in situ is between 0.25% and 1.5% by weight based upon the weight of the monomers.

The sulfur dioxide introduced into the system can be introduced as such into the polymerization medium or can be formed in situ through the employment of a compound capable of producing or liberating sulfur dioxide in the polymerization medium. Such materials are well known and include, for example, the alkali or alkaline earth sulfites, bisulfites, or metabisulfites, e.g., sodium sulfite, potassium sulfite, lithium sulfite, calcium bisulfite, barium bisulfite, magnesium bisulfite, sodium bisulfite, sodium metabisulfite, calcium metabisulfite, barium metabisulfite, etc. Any of the above materials are equivalent to the introduction of sulfur dioxide since the same are capable of liberating or producing the required sulfur dioxide in the polymerization medium. Accordingly, any and all of such materials can be advantageously employed in accordance with the process of the present invention. When such materials are employed in lieu of sulfur dioxide per se, the same are generally present in the system in an amount of from 0.4% to 2.5% by weight based on the weight of the monomers.

The second catalyst component copresent in the polymerization system of the present invention comprises an alkali or alkaline earth metal chlorate. Suitable materials include, for example, sodium chlorate, potassium chlorate, lithium chlorate, calcium chlorate, barium chlorate, magnesium chlorate, etc. Such second component of the catalyst system employed in accordance with the process of the present invention can be added to the polymerization medium over very wide limits. Thus, for example, it is possible to include an amount of chlorate within the polymerization medium of from about 0.1% to about 2% by weight based upon the monomers. However, in accordance with a preferred embodiment of the present invention, it has been found advantageous that the content of the chlorate within the polymerization medium is within the range of 0.25% and 0.8% by weight.

The third component of the catalyst system employed in accordance with the process of the present invention is an alkali or alkaline earth hypophosphite. Thus, for example, suitable materials include sodium hypophosphite, potassium hypophosphite, lithium hypyphosphite, calcium hypophosphite, barium hypophosphite, magnesium hypophosphite, etc.

Such material when employed in accordance with the process of the present invention is preferably employed in an amount of about 0.4% to about 1.5% by weight based upon the weight of the monomers. It is noted, however, that larger amounts, i.e., amounts up to about 5% by weight, for example, may be suitably used without any unsatisfactory results. For purposes of economics, however, it is preferred that the amount of hypophosphite be within that range set forth above.

In accordance with the process of the present invention the pH of the polymerization medium must be within the range of 1.8 to 2.7, the exact pH of the polymerization medium depending somewhat on the concentrations of the different constituents of the ternary re-dox system. With respect to the pH of the system, it is of particular note that when the ternary catalyst system comprises a chlorate, sulfur dioxide and a hypophosphite and such components are introduced simultaneously into the polymerization medium, the pH of the medium is automatically set within the preferred range as set forth above. In this regard, within the amounts of the various components specified above the pH of the system employing a chlorate, sulfur dioxide and a hypophosphite will be within the range of 1.8 and 2.7. However, when a chlorate, hypophosphite and a bisulfite or other salt capable of liberating sulfur dioxide are simultaneously introduced into the polymerization medium it will generally be necessary to add a strong acid, e.g., a mineral acid such as hydrochloric acid or sulfuric acid, to adjust the pH of the polymerization system to within that range set forth above, i.e., between 1.8 and 2.7.

As previously indicated, the process of the present invention is particularly applicable to the homopolymerization and copolymerization of monomeric systems predominating in acrylonitrile. Thus while the process of the present invention is particularly adapted for the homopolymerization of acrylonitrile, the process can be employed with advantage for the copolymerization of a monomeric system containing at least 80% by weight acrylonitrile units and up to 20% by weight of one or more ethylenically unsaturated monomeric materials copolymerizable with acrylonitrile. In this connection, any ethylenically unsaturated monomer, i.e., mono ethylenically unsaturated monomers copolymerizable with acrylonitrile can be advantageously employed as a comonomer in accordance with the process of the present invention. Thus, for example, suitable comonomers include, for example, acrylic and methacrylic acids, acrylic and methacrylic acid esters, e.g., methylmethacrylate, ethylmethacrylate, butylmethacrylate, methylacrylate, ethylacrylate, butylacrylate, etc., acrylic and methacrylic acid amides, e.g., acrylamide and methacrylamide, unsaturated organic acid and esters, e.g., vinyl propionate, vinyl butyrate, etc., vinyl sulfonic acid, styrene sulfonic acid, allyl or methallyl sulfonic acid, vinyl allyl or methallyl oxyarene sulfonic acids and their salts.

While the process of the present invention can be carried out in a batch or continuous manner, it is preferable to carry out the polymerization process continuously both for reasons of regularity and for the sake of economy. However, under certain circumstances the process of the present invention can be advantageously carried out batchwise.

Additionally, while the process of the present invention can be carried out in the presence of oxygen since oxygen can be tolerated in the polymerization process, it is generally preferred to work in the absence of oxygen, i.e., in the presence of an inert atmosphere such as nitrogen or carbon dioxide or in a full reaction vessel containing no air.

In addition to the above-identified essential components employed in accordance with the polymerization process of the present invention, it is also possible to include within the reaction medium various optional modifiers such as compounds that favor initiation of the polymerization or act as chain transfer agents.

As indicated previously, by carrying out the process of the present invention under the conditions described above, it is possible to provide close control over the polymerization reaction and thereby close control over the molecular weight of the polymer product.

Thus, for example, FIG. 1 is a curve representing variations in the specific viscosity of the polymer produced in accordance with the present invention for a given polymerization medium, i.e., kind and amount of the various monomers, residence time, temperature, etc., and a given apparatus, the specific viscosity being measured in a 0.2% solution in dimethyl formamide as a function of the amount of sulfur dioxide utilized. An observance of FIG. 1 indicates that the curve passes through a minimum and then through a maximum before a new decline for constant levels of chlorate and hypophosphite.

In accordance with the present invention, it is particularly advantageous to employ quantities of sulfur dioxide that are close to the minimum as shown in FIG. 1 since at this point accidental and relatively significant variations in the supply of sulfur dioxide or a compound or compounds capable of liberating or producing sulfur dioxide within the polymerization medium involve practically no changes in the specific viscosity of the polymers produced and, hence, substantially no change in the molecular weight of the polymer. This phenomenon is particularly of interest in an industrial process in which by virtue of the simplicity of operation and economy it is advantageous to directly recycle the untransformed monomers without purification thereby recycling the monomers without eliminating traces of sulfur dioxide which may be contained therein. In the absence of hypophosphite the direct recycling of monomers, at least in the initial period, would result in significant fluctuations in the sulfur dioxide of the untransformed monomers and in the overall level of the reaction, i.e., the transformation of the monomers to polymer. Such fluctuations disturbing the total quantity of sulfur dioxide in the polymerization medium would bring about variations in the molecular weight of the polymer, which variations are prejudicial to the final smooth operation of spinning of the polymer, and to the characteristics of the fibers obtained. Accordingly, in the absence of hypophosphite, any direct recycling of untransformed monomers would require vigilance of the total quantity of sulfur dioxide present, requiring measurement of the feed of recycled monomers and measurement of the sulfur dioxide content therein.

In contradistinction to this, however, the process of the present invention is much less sensitive to accidental variations in the supply of sulfur dioxide or products which can produce or liberate sulfur dioxide in the polymerization medium. Additionally, the process of the present invention leads to a much lower sulfur dioxide content in the untransformed monomers than would a similar process without hypophosphites. This is particularly true when work is done close to the minimum of the curve indicating the specific viscosity of the polymer as a function of the amount of sulfur dioxide employed.

For the sake of the same type of regularity it could also be advantageous to use amounts of sulfur dioxide that are close to the maximum of the curve of FIG. 1 or even beyond it, where the slope of this curve is slight. However, when too high a sulfur dioxide content is employed the level of transformation of the monomers to polymer is reduced and, hence, the economic value of the process is minimized. Accordingly, while applicable for purposes of regularity, such use of higher quantities of sulfur dioxide has been found economically disadvantageous.

The difference in specific viscosity between the maximum and the minimum of the curve of FIG. 1 is an expression to a certain extent of the intensity of the oxidation reduction phenomena which appear in the process of the present invention. The hypophosphite added to the chloratesulfur dioxide catalytic system can be considered to play a role in the oxidation-reduction reactions which initiate polymerization which is similar to that played by buffers in acidimetric reactions.

For specific polymerization conditions (kind and amount of the various monomers, temperature, residence time, reaction vessel volume) the configuration of the curve of specific viscosity of the polymer as a function of the sulfur dioxide to monomer ratio for a constant hypophosphite to monomer ratio varies with the chlorate to monomer ratio. In fact, for high values of the chlorate to monomer ratio, this curve no longer presents a minimum. However, the slope of this curve is more gentle than in a polymerization process without hypophosphite, so that the regulating effect of the hypophosphite, though less significant, is still effective. Obviously these high chlorate contents for which the slope of the curve is modified vary with the kind and relative proportions of the various monomers to be polymerized as well as with their concentration in the polymerization medium.

In regions in which the viscosity curve, a function of the sulfur dioxide to monomer ratio, is at a minimum, the position of this minimum can vary with the chlorate to monomer ratio for a constant hypophosphite to monomer ratio. When the chlorate to monomer ratio increases, the value of the specific viscosity at the minimum decreases and the value of the sulfur dioxide to monomer ratio that corresponds to this minimum also increases.

In addition, the position of the minimum depends likewise upon polymerization conditions, i.e., kind and quantity of the different monomers, temperature and residence time and agitation conditions of the reaction vessel.

The process of the present invention thus offers significant technical progress since it allows not ony the obtaining of a polymer with predetermined specific viscosity, but above all it makes it possible to operate under extremely stable conditions in which accidental fluctuations in supply which are inevitable in industrial production have no repercussions or few on the specific viscosity of the polymer. This technical advance is the more surprising in view of the fact that when the operation is performed in the presence of a chlorate-hypophosphite system without sulfur dioxide, there is no polymerization.

Moreover, the process of the invention allows production of a whiter polymer than is the case in a process without hypophosphite. The polymer is whiter as the sulfur dioxide to monomer ratio increases, but the increase of this ratio lowers the degree of transformation which can be elevated again by an increase of the chlorate to monomer ratio. This latter increase tends to lower the whiteness of the polymer somewhat. It is, therefore, advantageous to control the various factors to optimum conditions, depending upon the result that is desired. In addition, polymers obtained according to the present invention only yellow very slightly in the course of subsequent thermal treatments that they undergo either as polymers or as filaments made from these polymers or as textile articles containing such filaments.

The following examples, in which the parts and percentages are by weight, are to illustrate the present invention. In the examples, the degree of yellowness is measured in the following manner:

Using a photometric analyzer such as the apparatus sold by Zeiss under the mark Elrepho, the factors of diffuse reflection by the sample are coordinated with factors of diffuse reflection of a magnesium oxide tablet, successively for three filters, amber, green and blue. Percentages of reflectance $R_a$, $R_v$, and $R_b$ are obtained, which correspond respectively to the amber, green and blue filters. The degree of yellowness, expressed as percent, is then calculated according to the formula $$\frac{R_a - R_b}{R_v} \times 100$$

EXAMPLE 1

A 6 liter stainless steel polymerizing vessel and used and 200 parts acrylonitrile, 0.58 part potassium chlorate, 1.2 parts sodium bisulfite (bisulfite to monomer ratio: 0.6%, 1.6 parts pure crystallized sodium hypophosphite with 1 mole water (demineralized water in sufficient quantity for 1000 parts) and sulfuric acid to bring the pH to 2.4 were continuously introduced at a rate of 4 liters/hour. Polymerization was effected with constant agitation, the polymerization mixture being held to a temperature of 60° C.

With continuous overflow removal of the polymer that was formed, after the initial period, a homopolymer was obtained with specific viscosity of 0.312, measured at 2 g./liter in dimethyl formamide, 20° C. The degree of yellowness was 0.8%.

This experiment was repeated with variation of the amount of bisulfite utilized. The specific viscosity of the polymers obtained is shown by curve A, FIG. 2.

By way of comparison, similar experiments made without hypophosphite and with variations in the amount of bisulfite, all other conditions remaining the same, led to the results shown by curve A′, FIG. 2.

Examination of these curves reveals that in the process of the present invention (curve A) a variation of the bisulfite/monomer ratio from 0.6 to 1.3% only entails a change in specific viscosity of about 0.290 to 0.310, whereas in the control experiment the change in specific viscosity is considerably greater (0.340 to 0.600).

EXAMPLE 2

A 6 liter stainless steel polymerizing vessel was used and 188.9 parts acrylonitrile, 11.1 parts methyl methacrylate, 0.66 part potassium chlorate, 1.6 parts pure hypophosphite in the form of $NaH_2PO_2 \cdot 1H_2O$, 1.2 parts sodium bisulfite (bisulfite to monomer ratio, 0.6%), demineralized water in sufficient quantity to make up 1000 parts, and sulfuric acid to bring the pH to 2.4 were continuously introduced at a rate of 4 liters/hour. Polymerization was effected with constant agitation, the temperature of the mixture being held at 60° C.

With continuous overflow removal of the polymer suspension, a copolymer with specific viscosity of 0.390 measured as in Example 1 was obtained after an initial period, with the degree of transformation being 75%.

This experiment was repeated with variation of the amount of bisulfite. The results are indicated in Table 1, and the specific viscosity of the polymer is shown by curve B of FIG. 3.

TABLE 1

| Bisulfite used | Bisulfite/ monomers, percent | Specific viscosity | Degree of yellowness, percent |
|---|---|---|---|
| 0.6 | 0.3 | 0.530 | 0.6 |
| 1.2 | 0.6 | 0.390 | 0.5 |
| 1.6 | 0.8 | 0.385 | 0.2 |
| 2.0 | 1.0 | 0.440 | 0.4 |
| 2.6 | 1.3 | 0.550 | 0.5 |

By way of comparison, similar experiments without hypophosphite and with variation of the amount of bisulfite, all other conditions remaining the same, led to the results indicated by curve B′.

Examination of these curves reveals that a variation of the bisulfite-monomer ratio of 0.55 to 0.85% only leads, in the process of the present invention (curve B) to a variation of specific viscosity of about 0.400 to 0.380, whereas in the process without hypophosphite, the specific viscosity under these conditions would vary between 0.680 and 0.480.

EXAMPLE 3

A 6 liter polymerization vessel was used and 142.20 parts acrylonitrile, 3.95 parts methyl methacrylate, 3.85 parts potassium vinyloxybenzene sulfonate, 0.85 parts potassium chlorate, 2.1 parts sodium bisulfite (bisulfite to monomer ratio: 1.4%), 1.2 parts pure hypophosphite as $NaH_2PO_2 \cdot 1H_2O$, demineralized water in sufficient quantity to make up 1000 parts and sulfuric acid to bring the pH to 2.4 were continuously introduced at a rate of 3 liters/hour. Polymerization was effected with constant agitation, the temperature of the mixture being held to 60° C.

With 78.5% transformation, a copolymer was obtained with a specific viscosity of 0.228 (measured as in Example 1).

Figure 4:
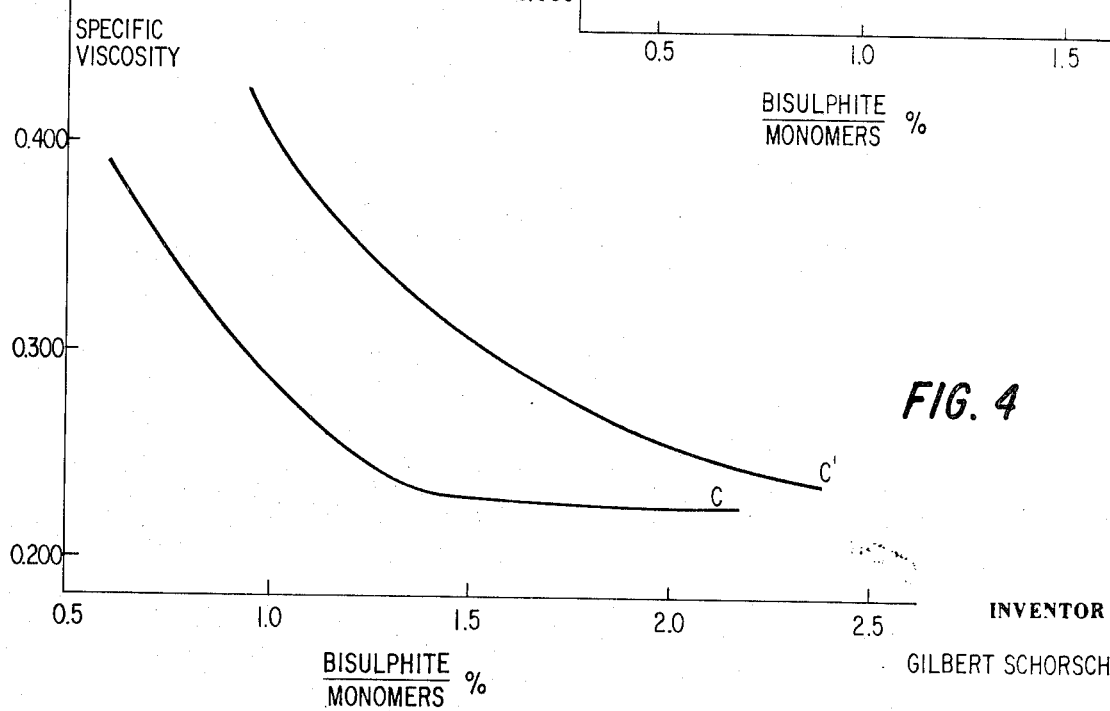

This experiment was repeated with variation of the amount of bisulfite used. The results are summarized in Table 2, and the specific viscosity of the polymer is represented by curve C, FIG. 4.

TABLE 2

| | Bisulfite/ monomers, percent | Specific viscosity | Degree of yellowness, percent |
|---|---|---|---|
| Bisulfite used: | | | |
| 0.9 | 0.6 | 0.390 | 1.3 |
| 1.5 | 1.0 | 0.286 | 0.8 |
| 2.1 | 1.4 | 0.228 | 0.9 |
| 2.7 | 1.8 | 0.224 | 0.6 |
| 3.1 | 2.2 | 0.222 | 0.2 |
| Control without hypophosphite | | | 2.4 |

By way of comparison, similar experiments effected without hypophosphite and with variation of the amount of bisulfite, all other conditions being the same, led to the results shown by curve C′.

Curve C, in contrast to curves A and B, does not show a minimum of specific viscosity but rather a very gentle slope that is comparable to a plateau, starting with a bisulfite to monomer ratio of 1.4%. The regularizing effect of the hypophosphite remains very substantial in this instance, in spite of the plateau, and the specific viscosity only varies from 0.228 to 0.222 when the bisulfite to monomer ratio passes from 1.4 to 2.2% or more, while the variation of specific viscosity is much greater when the polymerization is effected without hypophosphite (curve C′): 0.240 to 0.320.

EXAMPLE 4

A 6 liter stainless steel polymerizing vessel was used and 189.4 parts acrylonitrile, 8.8 parts methyl methacrylate, 1.8 parts potassium vinyloxybenzene sulfonate, 0.69 part potassium chlorate, 1.6 parts pure hypophosphite as $NaH_2PO_2, 1H_2O$, 1.6 parts sodium bisulfite (sulfite to monomer ratio: 0.8%), demineralized water in sufficient quantity to make up 1000 parts and HCl to bring the pH of the mixture to 2.4 were continuously introduced. Polymerization was effected with constant agitation, the temperature of the mixture being held to 60° C.

With 75% transformation, a copolymer was obtained with a specific viscosity of 0.390 measured as in Example 1.

This experiment was repeated with variation of the amount of bisulfite utilized. The results are shown by curve D, FIG. 5, which indicates that there is a slight variation of specific viscosity: 0.390 to 0.410 for bisulfite to monomer ratios varying from 0.66 to 1.04%.

EXAMPLE 5

Example 3 was repeated with 0.57 part potassium chlorate instead of 0.85, and at 50° C. instead of 60° C. Different values of the bisulfite to monomer ratio produced the tabulated results of Table 3, the specific viscosity being shown by curve E, FIG. 5.

TABLE 3

| | Bisulfite/ monomers, percent | Specific viscosity | Degree of yellowness, percent |
|---|---|---|---|
| Bisulfite used: | | | |
| 0.9 | 0.6 | 0.445 | 1.5 |
| 1.5 | 1.0 | 0.320 | 1.2 |
| 2.1 | 1.4 | 0.285 | 0.6 |
| 2.55 | 1.7 | 0.298 | 0.5 |
| 3.3 | 2.2 | 0.342 | 0.7 |
| Control without hypophosphite | | | 2.4 |

EXAMPLE 6

A 6 liter polymerizing vessel was used and 144.3 parts acrylonitrile, 4 parts methyl methacrylate, 1.7 parts sodium methallyl sulfonate, 0.54 part potassium chlorate, 1.2 parts sodium hypophosphate, sodium bisulfite, demineralized water in sufficient quantity to make up 1000 parts and sulfuric acid to bring the pH to 2.4 were introduced continuously at a rate of 3 liters/hour.

Polymerization was conducted with constant agitation at a temperature of 50° C.

Figure 5:
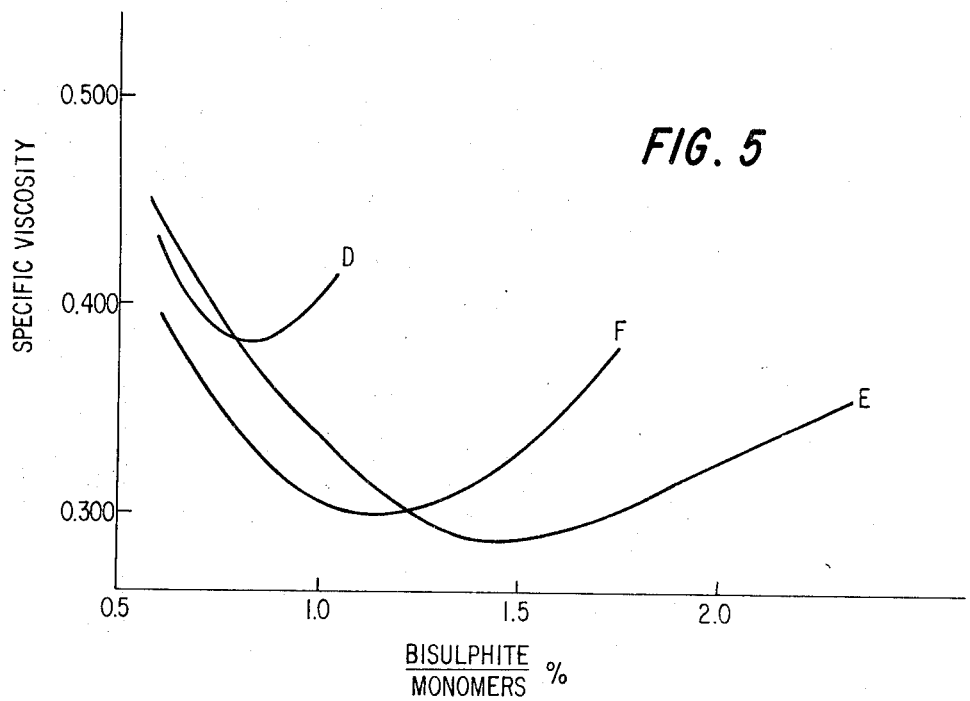

For various values of the bisulfite to monomer ratio, the results tabulated in Table 4 were obtained, the specific viscosity being represented by curve F, FIG. 5.

TABLE 4

| Bisulfite used: | Bisulfite/monomers, percent | Specific viscosity | Degree of yellowness, percent |
|---|---|---|---|
| 0.9 | 0.6 | 0.394 | 0.9 |
| 1.5 | 1.0 | 0.305 | 0.7 |
| 2.1 | 1.4 | 0.315 | 0.9 |
| 2.55 | 1.7 | 0.365 | 0.3 |
| Control without hypophosphite | | | 2.2 |

EXAMPLE 7

A 50 liter polymerization vessel was used and 189.3 parts acrylonitrile, 8.9 parts methyl methacrylate, 1.8 parts potassium vinyloxybenzene sulfonate, 1.6 parts sodium hypophosphite, potassium chlorate, sulfur dioxide and demineralized water in sufficient quantity to make up 1000 parts were introduced continuously at a rate of 33 liters/hour.

Various experiments were carried out with varying quantities of potassium chlorate and sulfur dioxide. In all cases, the pH was 2.4 so that it was not necessary to add acid.

Figure 6:
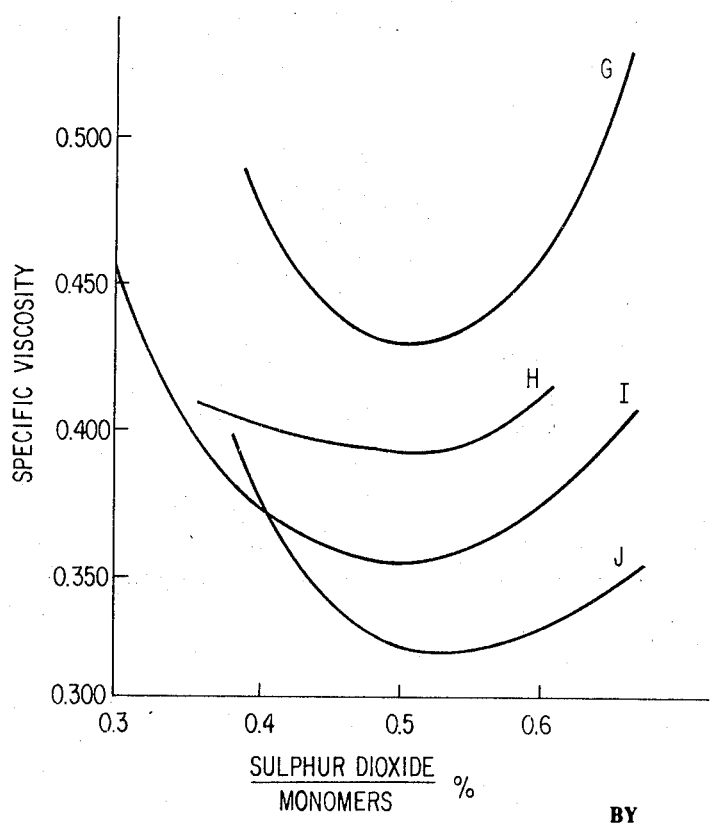

The results of these various experiments are represented as curves in FIG. 6, curve G showing the variation of specific viscosity of the polymer obtained, depending upon the quantities of sulfur dioxide used with the potassium chlorate to monomer ratio at 0.25%, curve H showing this same variation for a potassium chlorate to monomer ratio of 0.28%, curve I for a chlorate to monomer ratio of 0.31% and curve J for a chlorate to monomer ratio of 0.34%.

Examination of these curves clearly reveals the appearance of a minimum of specific viscosity of the copolymer for certain sulfur dioxide to monomer ratios, the value of the specific viscosity at the minimum varying with the value of the chlorate to monomer ratio, all other conditions being the same.

EXAMPLE 8

A 3000 liter polymerization vessel was used and 189.3 parts acrylonitrile, 8.9 parts methyl methacrylate, 1.8 parts potassium vinyloxybenzene sulfonate, 0.68 part potassium chlorate, 1.03 parts sulfur dioxide, 1.6 parts sodium hypophosphite, demineralized water in sufficient quantity to make up 1000 parts were introduced continuously at a rate of 2000 liters per hour. The pH of the polymerization mixture was 2.2 without need for addition of acid. Polymerization was effected with constant agitation at a temperature of 60° C.

With continuous overflow removal of the polymer suspension that formed, a copolymer with very regular specific viscosity was obtained. A check every 3 hours during 75 hours of operation showed a specific viscosity of 0.414±0.017 without any readjustment of feed of the different reagents in the course of the operation. The degree of yellowness of the polymer was 1.0%. The untransformed monomers had a very slight and regular content of sulfur dioxide ranging between 0.28 and 0.64 g./liter. These monomers can be introduced, without intermediate purification, into the feed circuit supplying monomers to the polymerizer without need for modifying the feed rate of the various reagents, especially that of sulfur dioxide, to obtain a polymer with a regular specific viscosity.

By way of comparison, the operation was repeated, without hypophosphite and with a slightly more sulfur dioxide, to obtain a polymer with a specific viscosity of the same order. In the course of a 75 hour run, with a check every 3 hours, a polymer with specific viscosity of 0.393±0.015 was prepared, i.e., with a regularity that is comparable to that of the earlier experiment, but this result was obtained by modifying the sulfur dioxide feed 4 times. Degree of yellowness of the product was 2.4%.

The untransformed monomers had a greater and very irregular sulfur dioxide content, ranging between 6.45 and 10.45 g./liter. If these untransformed monomers are to be introduced directly into the monomer feed of the polymerizer, it is necessary to modify the sulfur dioxide feed and to adjust this feed frequently in the course of operation to obtain a polymer with regular specific viscosity.

EXAMPLE 9

A 50 liter polymerization vessel was used and 189.7 parts acrylonitrile, 8.5 parts methyl methacrylate, 1.8 parts potassium vinyloxybenzene sulfonate, 0.68 part potassium chlorate, 1.77 parts sodium bisulfite, 1.3 parts sodium hypophosphite, 1.1 parts sulfuric acid and demineralized water in sufficient quantity to make up 1000 parts were introduced continuously at a rate of 33 liters/hour. The pH of the mixture was 2.5. Polymerization was effected with constant agitation and a temperature of 60° C. After several hours of operation, a copolymer was obtained with very great regularity, the product presenting a specific viscosity of 0.380 and a degree of yellowness of 1.3%, the two said values being measured as in Example 1.

One part of this polymer was treated at 150° C. for one hour, after which it showed a degree of yellowness of 7.5% as opposed to 10.0% for a polymer obtained without use of hypophosite.

Another part of this polymer was made up as a 20% solution in dimethylformamide, and the solution extruded into a coagulating bath containing 40% dimethylformamide and 60% water. The tow obtained was washed with water and drawn in boiling water, then dried. It then showed a degree of yellowness of 7.0% as opposed to 10.0% for a control tow made from a similar polymer prepared without use of hypophoshite.

After treatment of this two for 4 minutes at 190° C. its degree of yellowness was 11.8% as opposed to 15% for the control treated in the same way.

EXAMPLE 10

A 6 liter stainless steel polymerization vessel was used and 189.5 parts acrylonitrile, 8.7 parts methyl methacrylate, 1.8 parts potassium vinyloxybenzene sulfonate, 0.68 part potassium chlorate, 1.26 parts sodium bisulfite, 3 parts sodium hypophosphite, 0.11 part sulfuric acid and demineralized water in sufficient quantity to make up 1000 parts were introduced continuously, at a rate of 4 liters per hour. The pH of the mixture was 2.7 polymerization was effected with constant agitation and a temperature of 60° C.

After starting up the polymerizer, a polymer was obtained with specific viscosity of 0.415 measured as in Example 1, the degree of yellowness being 0.8%.

EXAMPLE 11

The above experiment was repeated, with 0.69 part potassium chlorate, 1.55 parts sodium bisulfite, 2 parts sodium hypophosphite, the quantities of the other constituents remaining as before. The pH of the mixture was 2.55. Polymerization was conducted as before.

After severl hours of operation, a polymer was obtained with very regular specific viscosity of 0.402, the degree of yellowness being 0.5%.

This experiment was repeated several times with different quantities of bisulfite, which led to the results tabulated in Table 5.

TABLE 5

| Bisulfite used | Bisulfite/monomers, percent | Specific viscosity |
|---|---|---|
| 0.68 | 0.34 | 0.614 |
| 0.84 | 0.42 | 0.420 |
| 1.55 | 0.775 | 0.402 |
| 1.70 | 0.85 | 0.390 |
| 2.43 | 1.215 | 0.498 |

EXAMPLE 12

Example 10 was repeated once more, with 0.7 parts potassium chlorate, 1.70 parts sodium bisulfite, 1 part sodium hypophosphite, the quantities of the other constituents being the same as before. The pH of the mixture was 2.5.

After several hours of polymerization with constant agitation at 60° C., a polymer with a very regular specific viscosity of 0.405 measured as in Example 1, with a degree of yellowness of 0.8% was obtained.

This experiment was repeated several times with modification of the amounts of bisulfite, leading to the results tabulated in Table 6.

TABLE 6

| Bisulfite used | Bisulfite/ monomers, percent | Specific viscosity |
|---|---|---|
| 0.68 | 0.34 | 0.748 |
| 1.70 | 0.85 | 0.405 |
| 2.44 | 1.22 | 0.335 |

EXAMPLE 13

A 6 liter stainless steel polymerization vessel was used and 189.4 parts acrylonitriles, 8.8 parts methyl methacrylate, 1.8 parts potassium vinyloxybenzene sulfonate, 0.69 part potassium chlorate, 1.6 parts sodium hypophosphite, sodium bisulfite, demineralized water in sufficient quantity to make up 1000 parts, and sulfuric acid to bring the pH to 2.6 were continuously introduced at a rate of 4 liters per hour. Polymerization was effected with constant agitation, at a temperature of 70° C.

For different sodium bisulfite contents, the results tabulated in Table 7 were obtained.

TABLE 7

| Bisulfite used | Bisulfite/ monomers, percent | Specific viscosity |
|---|---|---|
| 0.76 | 0.38 | 0.730 |
| 1.10 | 0.55 | 0.490 |
| 1.62 | 0.81 | 0.395 |
| 1.98 | 0.99 | 0.464 |
| 2.36 | 1.18 | 0.500 |

It can be seen from the above that the process of the present invention directed to the homopolymerization of acrylonitrile or the copolymerization of the same with one or more ethyelnically unsaturated monomers allows for a distinct advance in the art.

What is claimed is:

1. A process for the polymerization of a monomer system comprising at least 80% by weight of acrylonitrile which comprises effecting such polymerization in an aqueous medium at a pH of between 1.8 and 2.7 and at a temperature in the range of 30° and 70° C., in the copresence of:
   (1) at least 0.1% by weight based on the weight of the monomer system of an alkali or alkaline earth metal chlorate;
   (2) at least 0.25% by weight of sulfur dioxide or at least 0.4% by weight of a compound capable of liberating sulfur dioxide in the polymerization system, based on the weight of the monomer system; and
   (3) at least 0.4% by weight based on the weight of the monomer system of an alkali or alkaline earth metal hypophosphite.

2. The process of claim 1 wherein the hypophosphite is present in an amount of from 0.4% to 1.5% by weight based on the weight of the monomer system.

3. The process of claim 1 wherein the sulfur dioxide is present in an amount of from 0.25% to 1.5% by weight based on the weight of the monomer system.

4. The process of claim 1 wherein the sulfur dioxide is formed in situ by the copresence of an alkali or alkaline earth metal bisulfite.

5. The process of claim 4 wherein said bisulfite is present in an amount from 0.4% to 2.5% by weight based on the weight of the monomer system.

6. The process of claim 1 wherein the alkali or alkaline earth metal chlorate is present in an amount of from 0.1 to 2% by weight based on the weight of the monomer system.

7. The process of claim 6 wherein said chlorate is present in an amount of from 0.25% to 0.8% by weight based on the weight of the monomer system.

8. A process for the polymerizatoin of a monomer system comprising at least 80% by weight acrylonitrile which comprises effecting such polymerization in an aqueous medium at a pH of between 1.8 and 2.7 and at a temperature in the range of 30° and 70° C., in the copresence of:
   (1) from 0.1% to 2% by weight of an alkali or alkaline earth metal chlorate based on the weight of the monomer system;
   (2) from 0.25% to 1.5% by weight sulfur dioxide or 0.4% to 2.5% by weight of a compound capable of liberating sulfur dioxide in the polymerization system, based on the weight of the monomer system; and
   (3) 0.4% to 1.5% by weight of an alkali or alkaline earth metal hypophosphite based on the weight of the monomer system.

9. The process of claim 8 wherein said compound capable of liberating sulfur dioxide in the polymerization system comprises an alkali or alkaline earth metal bisulfite.

10. The process of claim 8 wherein said alkali or alkaline earth metal chlorate is present in an amount of 0.25% to 0.8% by weight based on the weight of the monomer system.

References Cited
UNITED STATES PATENTS 2,673,192 3/1954 Hill _____ 260—88.7 Orig.
3,280,086 10/1966 Nakajima et al. _ 260—85.5 Orig.

HARRY WONG, Primary Examiner

U.S. Cl. X.R.

260—79.3, 80.6, 85.5 D